United States Patent
Beaulieu et al.

(10) Patent No.: US 12,528,202 B2
(45) Date of Patent: Jan. 20, 2026

(54) COLLAPSIBLE SPLINED FINGERS FOR RATCHETING ENGAGEMENTS AND HIGH NORMAL FORCE EXERTION

(71) Applicant: TOYOTA RESEARCH INSTITUTE, INC., Los Altos, CA (US)

(72) Inventors: Andrew M. Beaulieu, Somerville, MA (US); Alexander Alspach, Somerville, MA (US)

(73) Assignee: Toyota Research Institute, Inc., Los Altos, CA (US)

( * ) Notice: Subject to any disclaimer, the term of this patent is extended or adjusted under 35 U.S.C. 154(b) by 980 days.

(21) Appl. No.: 17/697,525

(22) Filed: Mar. 17, 2022

(65) Prior Publication Data

US 2023/0294302 A1    Sep. 21, 2023

(51) Int. Cl.
  B25J 15/02    (2006.01)
  B25J 15/00    (2006.01)

(52) U.S. Cl.
  CPC ......... B25J 15/022 (2013.01); B25J 15/0028 (2013.01)

(58) Field of Classification Search
  CPC ...................................................... B25J 15/12
  See application file for complete search history.

(56) References Cited

U.S. PATENT DOCUMENTS

| | | | |
|---|---|---|---|
| 10,011,019 B1 | 7/2018 | Strauss | |
| 10,322,511 B1 | 6/2019 | Strauss | |
| 10,933,536 B2 | 3/2021 | Strauss | |
| 11,820,003 B2* | 11/2023 | Stewart | B25J 15/12 |
| 2019/0168393 A1* | 6/2019 | Strauss | B25J 15/12 |
| 2020/0346792 A1* | 11/2020 | Curhan | B25J 15/10 |
| 2021/0101292 A1* | 4/2021 | Kuppuswamy | B25J 13/082 |
| 2021/0362353 A1* | 11/2021 | Dürr | B25J 15/12 |
| 2023/0241785 A1* | 8/2023 | Harrigan | B25J 9/1653 |
| | | | 700/245 |
| 2023/0321848 A1* | 10/2023 | Beaulieu | B25J 13/081 |
| 2024/0238986 A1* | 7/2024 | Parikh | B25J 15/0052 |
| 2024/0399564 A1* | 12/2024 | Johnson | B25J 15/0009 |

FOREIGN PATENT DOCUMENTS

| | | | | |
|---|---|---|---|---|
| CN | 106881725 | * | 6/2017 | |
| CN | 108555958 A | | 9/2018 | |
| CN | 113246160 | * | 8/2021 | |
| CN | 113733149 | * | 12/2021 | |
| CN | 115070814 | * | 9/2022 | |
| CN | 118386277 | * | 7/2024 | |
| JP | 4333628 B2 | | 9/2009 | |
| WO | 2018230729 A1 | | 12/2018 | |
| WO | WO-2021244938 A1 | * | 12/2021 | ......... B25J 15/0009 |

\* cited by examiner

*Primary Examiner* — William A. Rivera
(74) *Attorney, Agent, or Firm* — Dinsmore & Shohl LLP (57) ABSTRACT

A robotic system for grasping an object including a set of movable robotic fingers that may be in the form of a gripper or other moldable robotic finger similarly formed. The robotic fingers include one or more collapsible structures on the surface of an inner pad of the two or more fingers. The collapsible structures are curved structures that support a grasped object and collapse when an object is pulled in an outward direction, the outward direction including from a base to the to the tip of the two or more fingers. A servo motor may control the movement of the fingers or the movement of the collapsible structures.

18 Claims, 4 Drawing Sheets

COLLAPSIBLE SPLINED FINGERS FOR RATCHETING ENGAGEMENTS AND HIGH NORMAL FORCE EXERTION

TECHNICAL FIELD

The embodiments described herein generally relate to gripping objects with a robotic gripping device. Certain embodiments include two robotically operated fingers that move together to grasp an object and can include grippers made from various materials.

BACKGROUND

Robotic devices for assisting users have been developed over the past few years. These devices can be used for a variety of applications including manufacturing new materials, transporting objects, assembling and processing new technology, among other functions. These devices have become more complicated over the years and can perform using artificial intelligence and other advanced algorithms. Various robotic gripping devices have been developed over the years, including specialized grippers, where the configuration is determined based on the type of object the robotic device is grasping.

Accordingly, a need exists for alternative methods of gripping objects whereby the object does not slip through the fingers of the gripping device.

SUMMARY

The present application is directed to robotic devices that are used to grasp objects using splined fingers (the terms "finger or fingers" and "gripper or grippers" are used interchangeably herein to refer to the same or similar devices). Embodiments of the present disclosure encompass robotic devices that are used for ratcheting engagements, among other types of engagements with different objects and with various rotatable objects, but the current robotic device is not limited solely to this application.

Embodiments of the present disclosure include a robot system using one or more fingers with a collapsible structure or structures, also known as splines, on the surface of inner pads of the fingers to more firmly grasp an object to be moved (the terms "spline or splines" and "collapsible structure or collapsible structures" are used interchangeably herein to refer to the same or similar devices). Current finger grippers have flat inner surfaces or sidewalls, which may be slippery so that an object held by the finger may slip out of them. The collapsible structures in the current disclosure help the fingers more tightly hold an external object. The collapsible structures can be made of a thermoplastic polyurethane (TPU) in order to have elasticity and resistance to oil, grease or other substances that may be on the object trying to be grasped. The type of material may impact the flexibility of the splines or structures, such that a more flexible material may grip the object with more force than a less flexible material. The material also includes polyurethane or vulcanized rubber.

The collapsible structure or structures on the fingers act as supporting shelves (e.g., interference friction structures) when engaged onto a grasped object. The device and system can include that as force is applied upward in addition to a force normal to the plane of the fingers, the object is grasped more firmly. The collapsible structures may be curved structures that support the grasped object and collapse when an object is pulled in a certain direction (e.g., from a base to tip of the finger) so that the object is not dropped. The collapsible structures can allow for a substantial increase in force that is parallel with the finger exerted onto objects once engaged. The collapsible structures may move passively, driven by finger normal forces. For example, when the fingers move in a direction to grasp an object, the collapsible structures on the inner pads of the fingers may collapse using a rotational movement to engage with the object. Further, the normal force acts perpendicular to the surface of the incline plane of the finger in order to hold an object. In some embodiments, a servo-motor may actuate the collapsible structures to control variable friction or engagement. Further, the number of collapsible structures on the inner pads can be varied based on the usage of the fingers.

In one embodiment, a robotic gripping device includes two or more opposable fingers configured to move toward each other to grasp an object, wherein the two or more fingers include one or more collapsible structures on the surface of an inner pad of the two or more fingers.

In another embodiment, a robotic gripping apparatus comprises two or more opposable fingers configured to move toward each other to grasp an object, wherein the two or more opposable fingers include: an inner surface; an outer surface; a set of ribs that connect the inner and outer surface; and a set of collapsible structures on the inner surface.

In another embodiment, a robotic gripping system includes a robotic gripping device with two or more opposable fingers configured to move toward each other to grasp an object, wherein the two or more fingers include one or more collapsible structures on the surface of an inner pad of the two or more fingers. The robotic gripping system further includes a control system configured to control the robotic gripping device, wherein the control system includes one or more processors, a non-transitory computer-readable memory, and program instructions stored on the non-transitory computer-readable memory and executable by the one or more processors to control the robotic gripping device.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

As humans, our hands are conformable to different objects that we hold which allows us to determine the shape of an object without looking at the object. Further, our sense of touch provides information as to how to properly grasp and hold an object. Our fingers are more sensitive to touch and our skin can conform to different objects that we pick up with our hands. Human hands are more adaptable to grasping and conforming to object compared to other parts of the body, such as arms.

Currently, robotic devices interact with objects in a variety of ways including, pushing, pulling, and grasping among other ways of interaction. Warehouses and other industrial buildings routinely employ robots and other devices to move large objects with robotic devices, especially on assembly lines in storage applications. A robotic device may include a robotic gripper at the end of a robotic arm to grasp an object. This gripper can have one or more fingers that can be moved in order to grasp an object. These fingers can be controlled by various mechanisms for ease of use and efficiency in grasping an object.

Robotic devices with arms are commonly equipped with end effectors that are configured to perform certain tasks. For example, an end effector of a robotic arm may be configured as a human hand, or as a two-fingered gripper. However, robots do not have varying levels of conformability such as the human skin and muscles as do humans. End effectors may use different materials to further help shape the effectors to grasp the object in a include sensors such as pressure sensors, but such sensors provide limited information about the object that is in contact with the end effector. Thus, the robot may damage a target object by using too much force, or by having an end effector that is too hard or the robot may drop the object because it does not properly grasp the object.

Further, in some applications, a deformable end effector may be desirable in order to grasp an object with an unusual shape. For example, a deformable end effector may be desirable in robot-human interactions to help grasp an object with sufficient force to move the object. Further, a deformable/compliant end effector may be desirable when the robot manipulates fragile objects. Further still, based upon objects encountered and changing conditions within an environment, it may be desirable to have deformable end effectors or fingers with additional components including splines to further help grip objects. In various embodiments of the disclosure, the splines can collapse into the inner surface of the finger when a certain force is applied an object being gripped, further allowing for the object to be held with a firmer grip in order to move the object. Further, in some embodiments of the present disclosure the splines on the inside of the end effector or finger that physically engage the object may collapse inward while other splines help to support the object.

Embodiments of the present disclosure can include a robotic finger or a set of fingers that are connected and define a pair of fingers that may grasp an object. As a non-limiting example, the first finger may be a fin ray gripper with collapsible structures along the length of the inside surface of the gripper. Further, a robotic device may include two fingers with collapsible structures on the inner surface of the fingers to create a pincer movement in order to grasp an object. The collapsible structures can be made using various shapes and sizes of materials depending on the application of the robotic device. For instance, the structures can be made of a thermoplastic polyurethans (TPU) in order to have elasticity and resistance to oil, grease or other substances that may be on the object trying to be grasped. The structures can also be made of thermoplastic elastomer (TPE) materials, which exhibits the characteristics of rubber. Such examples should not limit the materials that the structures can consist, and further water-cutting methods can form different shapes of the structures.

The embodiments described herein address and overcome the deficiencies of a robotic device with fingers that are merely smooth and cannot grasp an object. In some embodiments, the fingers are operably connected to a base, which is further operably connected to a pivot joint on the arm of the robot, which can be connected to a servomotor to retract the springs or other in the arm, and can pull one of the fingers to tighten the grip. Further the fingers can be actuated by a smart pivot or smart hinge that is controlled through various springs that are set at different tensions in order to grasp the object. In embodiments, the collapsible structures can be in a variety of configurations including a number of rows and columns depending on the shape of the finger. The robotic device may be implemented in various forms, such as a robotic arm, industrial robot, or some other arrangement. Furthermore, the robotic device may also be referred to as a robot, robotic system, or mobile robot, among other designations. In addition, the robotic device can be controlled by a servomotor or a computer with a processor using general or special purpose hardware and that executes computer instructions stored in data storage on a computer readable medium.

Figure 1:
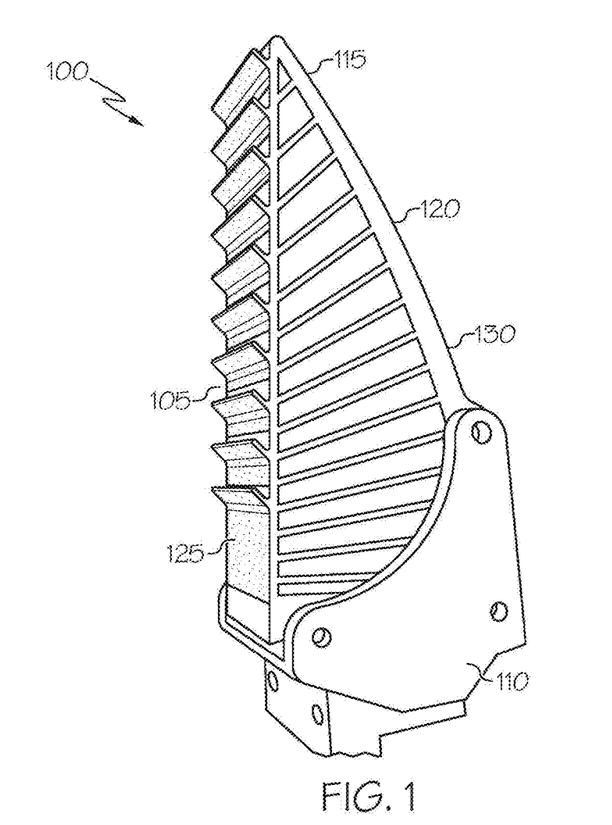
FIG. 1 depicts a non-limiting example of a system with two collapsible splined fingers for exerting force on an object.

Referring now to the drawings, FIG. 1 shows an example robotic gripping device including a finger 115 configured to operate in a variety of circumstances to grasp an object in concert with another similarly situated finger. The base 110 may be operatively coupled to a robot so that the robot can perform various tasks set by a user. The base may be stationary or movable and may controlled by a control system.

The finger 115 includes one or more collapsible structures or splines 105 located on an inner surface 125 of the finger 115, and the splines 105 can collapse into the finger 115 based on the amount of force exerted by the user. When in operation, the inner surface 125 of the finger 115 conforms to the shape of the object in order for the object to be picked up and moved. Further, the finger 115 is operatively coupled to a base 110 that holds the finger 115 in place depending on the usage of the finger.

An outer surface 130 of the finger 115 is connected to the inner surfaced 125 through ribs 120 that bend and curve with the shape of the object and further apply force so that the object is held securely. The collapsible structures 105 can be in various configurations, including in rows and columns, with various distances between the structures, depending on the application of the robotic device. When the robotic device system 100 uses the fingers 115 to grasp and object, the fingers 115 can deform to grasp the object.

Figure 4:
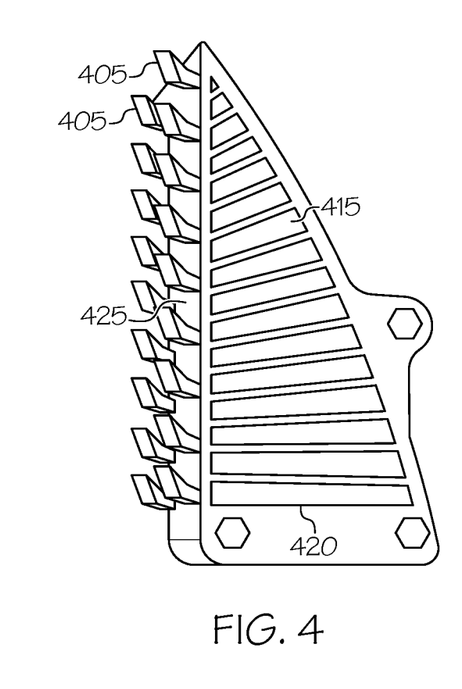
FIG. 4 depicts a second embodiment of a collapsible splined finger for grasping objects in a robotic system.

The shape of the finger, which can also be a fin ray gripper, in FIG. 1 is not limited to a curved triangular shape with splines along the flat edge. The material for each of these elements is a flexible material and can be different depending on the application of the robotic finger. Further, in some embodiments there may splines reaching the outer edge from the inner portion of the flat surface of the finger 115 where the splines 105 protrude in a straight row fashion as shown in FIG. 4. The base 110 of the finger can contain various ways to secure the finger 115 including screws and the like. Other shapes of the fin ray gripper are also considered in this application, including a more rectangular shaped gripper. In one embodiment, as the finger 115 is moved upward on the object the collapsible structures 105 further secure the object and conform to the object as the collapsible structures 105 are moved into contact with the object. The other collapsible structures that do not engage with the object remain fixed and allow for various shapes of objects to be gripped with an appropriate level of force.

In addition, the collapsible structures 105 can be made using various shapes and sizes of materials depending on the application of the robotic device. The structures 105 can be made of a thermoplastic polyurethans (TPU) in order to have elasticity and resistance to oil, grease or other substances that may be on the object trying to be grasped. The type of material may impact the flexibility of the splines or structures, such that a more flexible material may grip the object with more force than a less flexible material. The material may also include polyurethane or vulcanized rubber. This relationship between flexibility and gripping power can be adjusted for a particular application. For instance a larger, more heavy object may require a stiffer material to grip, with more sturdy structures 105, than a smaller object. The structures 105 can also be made of thermoplastic elastomer (TPE) materials, which exhibits the characteristics of rubber. Such examples should not limit the materials that the structures 105 can consist, and further water-cutting methods can form different shapes of the structures.

The operation of the two fingers includes whereby the collapsible structures or splines 105 grasp the object as the fingers move toward the object and apply pressure to the object in order to pick up the object and move it per the particular task the robot is undertaking. Further, the collapsible structures 105 can collapse against the side of the object on the interior surface 115 of the finger 115 and not on the outside of the object near an edge, in order to support the object as it moves. The finger 115 can move in multiple directions including the vertical or horizontal directions and the plane that is perpendicular to the ground, such that the two fingers move toward each other and upward to grasp the object. The combination of the two motions causes the fingers to conform to the shape of the object.

Figure 2:
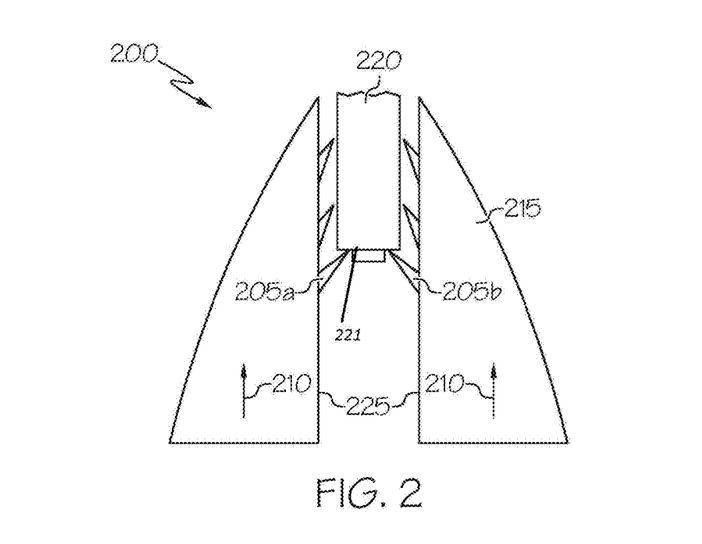
FIG. 2 depicts an embodiment including a collapsible splined finger for grasping objects in a robotic system.

FIG. 2 shows a robotic device system 200 for grasping an object 220. The example configuration shown in FIG. 2 is not limited to such a configuration but is one example that may be used in connection with the implementations described herein. In one embodiment, the two fingers 215 (which may be configured in a similar manner as the finger 115 illustrated in FIG. 1 or be differently configured) can be pushed upward and toward each other to grasp an object 220.

The fingers 215 includes collapsible structures 205 that assist in grasping the object 220. As shown in FIG. 2, the structures 205 in contact with the object 220 collapse into the inner surface 225 of the fingers 215 when a certain amount of force is applied to the object 220 by the fingers 215. However, the collapsible structures 205 that are not disposed between the object and the inner surface 225 of the fingers 215 do not collapse and thus may support the object 220, thereby preventing the object 220 from slipping with respect to the fingers 215. As shown in FIG. 2, collapsible structures 205a and 205b are not collapsed and support a lower surface 221 of the object 220. Further, there are finger bases 210 for fingers 215 that move along with the fingers 215 in the upward direction as the object 220 is being grasped.

Figure 3:
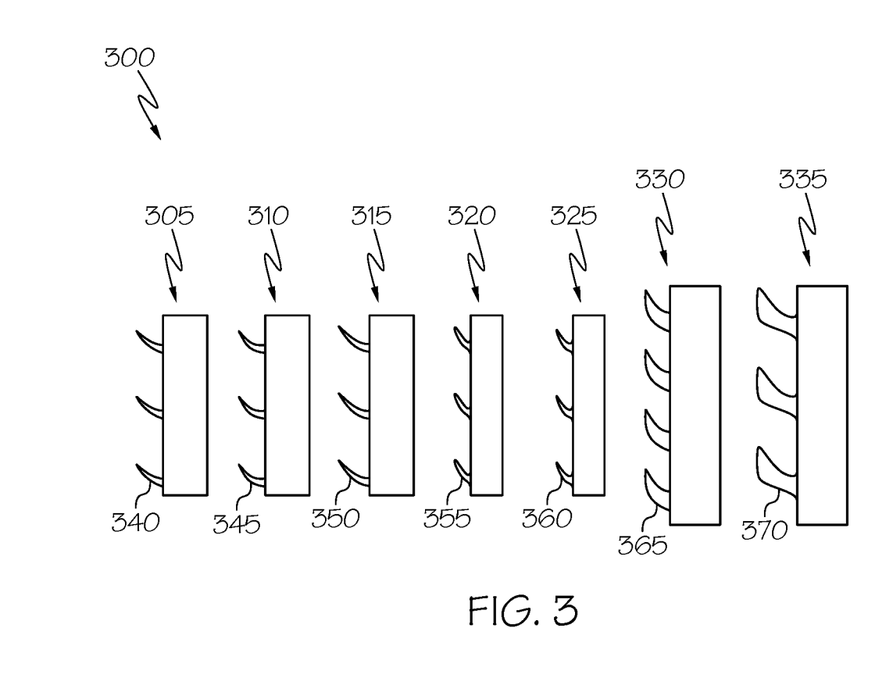
FIG. 3 depicts various embodiments of a collapsible splined finger for grasping objects in a robotic system.

FIG. 3 shows various non-limiting, example configurations of the collapsible structures of robotic fingers of the present disclosure. The collapsible structures can vary based on shape and material that they are composed of, and can include materials such as rubber and other composite materials that enable the finger to conform to the shape of the object that is grasped. The collapsible structures can have varying shapes as shown in FIG. 3, but generally protrude from the inner surface of the finger as shown. The different configurations allow the finger to grasp different objects with varying force.

For instance, the collapsible structures 340 on finger portion 305 are thin and at a steep angle in order to help grip an object. In finger portion 305, the collapsible structures 340 are angled away from the object to be picked up in order to provide a strong pressure to the object being picked up.

The collapsible structures 345 on finger section 310 are larger than those on finger section 310 to potentially grab heavier objects as they are pressed against the finger. The structures 345 can also be thicker both in width and depth than the collapsible structures of finger portion 305 so that the collapsible structures can press against the object and then collapse into the base of the finger so that the object is held more firmly for moving or other purposes.

The collapsible structures 350 of finger portion 315 have a curved shape like those of finger portion 310 that allow different amount of forces to be pressed up against an object. The collapsible structures 350 on finger portion 315 are longer than the collapsible structures 340 of finger portion 310 and allow a more spring like action to engage an object and hold it securely within the grasp of the fingers.

The collapsible structures 355 of finger portion 320 are shorter and closer to the inner surface. The collapsible structures 355 of finger portions 320 are closer to the inner surface of the finger and allow for less maneuvering of the object once it is secure.

The collapsible structures 360 on finger portion 325 are further from the base than the collapsible structures 355 of finger portion 320 and are thus able to provide more surface area for support as they are extended away from the finger. The collapsible structures 365 on finger portion 330 are thicker and longer than the collapsible structures of the previous examples. Finally, the collapsible structures 370 of finger portion 335 are larger and take up more space on the finger and are thus able to grip different objects with more support than a flat surface. As shown there are less collapsible structures 370 per vertical distance on finger portion 335 compared to the other examples, and therefore there will be more surface area of the object contacted that can potentially be engaged by the collapsible structures 370 of finger portion 335.

FIG. 4 shows another embodiment of a finger 415 and two rows of collapsible structures 405 on the inner surface 425 of the finger 415 that makes contact with the object. The splines 420 allow the finger 415 to conform to the shape of the object that is grasped. As the object is grasped by the finger 415, the collapsible structures 405 move inward toward the inner surface 425 of the finger 415. As an example, when the object is held in the center of the fingers, the collapsible structures 405 in the center of the finger 405 collapse toward the ribs 410, while the other collapsible structures 405 that are not pressed by the object help to support the object being grasped.

It should be understood that other configurations of the finger 415 and the collapsible structures 405 can be envisioned. Further, the angle of the collapsible structures 405 can be changed in order to grasp an object more loosely or tightly. The design of the collapsible structures 405 can be varied as well. The collapsible structures 405 may be shaped simply as prongs or as prongs with a bent or angled end to engage the object. In general the collapsible structures 405 can be made of the same material as the finger 415 or may be made of a different material. The collapsible structures 405 may collapse or move inward based on the amount of force that the object requires to be held.

The collapsible structures 405 may also have different shapes such as a base with an angle downward or to either side depending on the use of the fingers. These collapsible structures 405 can be allowed to bend, curve, or otherwise change shape depending on the usage of the fingers. Further, the structures can be made of a variety of materials in order to accomplish different lifting tasks within varying environments.

Figure 5:
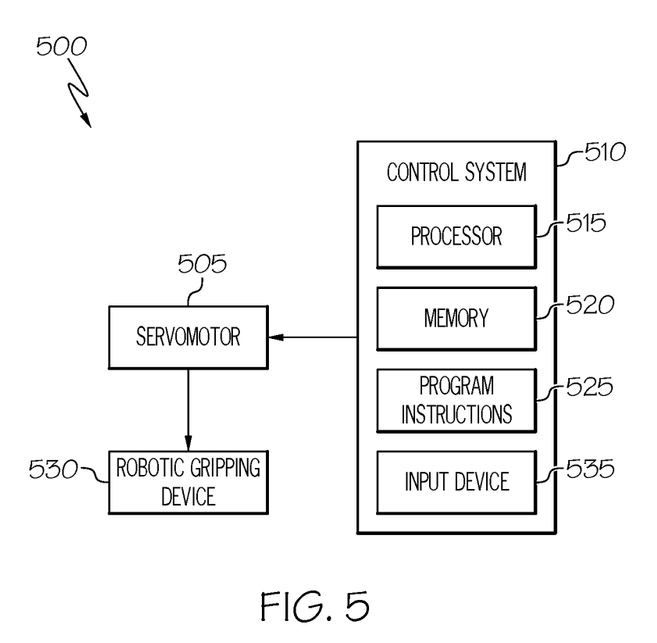
FIG. 5 depicts a control system for a collapsible splined finger for grasping objects in a robotic system.

FIG. 5 shows an example embodiment of an example system 500 that controls the fingers of a robotic device. The various components of the system 500 may be connected in any manner, including wired or wireless connections. Further, in some examples, components of the robotic system may be distributed among multiple physical entities rather than a single physical entity. Other example illustrations of robotic system 500 may exist as well. There is included in the system 500 a servomotor 505, a control system 510, with processor 515, memory 520, program instructions 525, an input device 535 and a robotic gripping device 530 that contains any one of the examples of FIG. 1-4. The robotic gripping device 530 can have various configurations. For instance, the robotic gripping device 530 can have one or more fingers 215 that grasp object 220 based on commands from a user input through the input device 535. Processor 515 may include one or more processing units, such as, without limitation, a multi-core configuration. In one embodiment, processor 515 includes a field programmable gate array (FPGA). Processor(s) 515 may operate as one or more general-purpose hardware processors or special purpose hardware processors (e.g., digital signal processors, application specific integrated circuits, etc.). The processor(s) 515 may be configured to execute computer-readable program instructions, and manipulate data, both of which are stored in the data storage. The processor(s) 515 may also directly or indirectly interact with other components of the robotic system 100, such as the servomotor 505 or any other component connected to the control system 510.

The memory 520 may be one or more types of hardware memory. For example, the memory 520 may include or take the form of one or more computer-readable storage media that can be read or accessed by processor(s) 515. The one or more computer-readable storage media can include volatile and/or non-volatile storage components, such as optical, magnetic, organic, or another type of memory or storage, which can be integrated in whole or in part with processor(s) 515. In some implementations, the memory 520 can be a single physical device. In other implementations, the memory 520 can be implemented using two or more physical devices, which may communicate with one another via wired or wireless communication. As noted previously, the memory 520 may include the program instructions 525 and various types of data. The data may be any type of data, such as configuration data, sensor data, and/or diagnostic data, among other possibilities.

The devices may be connected via a network, and the network may include any wired or wireless networking hardware, such as a modem, Local Area Network (LAN) port, wireless fidelity (Wi-Fi) card, WiMax card, mobile communications hardware, and/or other hardware for communicating with other networks and/or devices, of FIG. 5. The Control System 510 is communicatively coupled to the Servomotor 505, which is in turn communicatively coupled to the robotic gripping device 530. The width of the cup or the object 220 may be measured by an image scanning of an image sensor unit (not shown), and a processor 515 may control a gap between the first finger and the second finger according to the measured width.

In other embodiments, processor 515 may include any type of processor that enables control system 510 to function as described herein. In some embodiments, executable instructions are stored in memory device 520. Control system 510 is configurable to perform one or more executable instructions 525 described herein by programming processor 515. For example, processor 515 may be programmed by encoding an operation as one or more executable instructions and providing the executable instructions in memory device 520. In one embodiment, memory device 520 is one or more devices that enable storage and retrieval of information such as, without limitation, executable instructions or other data. Memory device 520 may include one or more tangible, non-transitory, computer readable media, such as, without limitation, random access memory (RAM), dynamic RAM, static RAM, a solid-state disk, a hard disk, read-only memory (ROM), erasable programmable ROM, electrically erasable programmable ROM, or non-volatile RAM memory. The above memory types are exemplary only, and are thus not limiting as to the types of memory usable for storage of a computer program.

Servomotor 505 may be controlled by control system 510 in order to grasp an object 220 with the various finger configurations 215. The servomotor 505 can also be replaced by other motors, including hydraulic motors with hydraulic cylinders and should not be limited to any particular servomotor. The user can also enter into the control system 510 via input device 535 a desired pressure to grasp an object 220 with the fingers 215. Nothing should be seen as limiting various embodiments to further grasp an object 220 and allow the fingers 215 with collapsible structures 105, 405 to move freely and consistent with a user's intentions.

A computer readable signal medium can include any type of computer readable medium that is not a computer readable storage medium and may include, for example, propagated signals taking any number of forms such as optical, electromagnetic, or a combination thereof. A computer readable signal medium may include propagated data signals containing computer readable code, for example, within a carrier wave. Computer readable storage media and computer readable signal media are mutually exclusive.

The processor can also control various sensors on the robotic device and other parts of the control process. There can also be included a power source and other mechanical and electrical components in order to carry out the purpose of the robotic device. The processor can be part of a control system to control the operation of the robotic device and can communicate through wired or wireless means the instructions to the robotic device. Each of the processor and other elements including a power source can be electrically coupled within the control system. There may be a camera in operation with the robotic arm to help guide the robotic arm to pick up various objects. The camera may work to provide an image of the object to a computer system with a processor and image analysis software may be used in order to position the robotic arm and fingers in the correct place. As the fingers on the robotic arm are moved through a servomotor or other electromechanical means, the collapsible structures can collapse where they make contact with the object and those that do not collapse can help to support and hold the object so that it may be moved.

Figure 6:
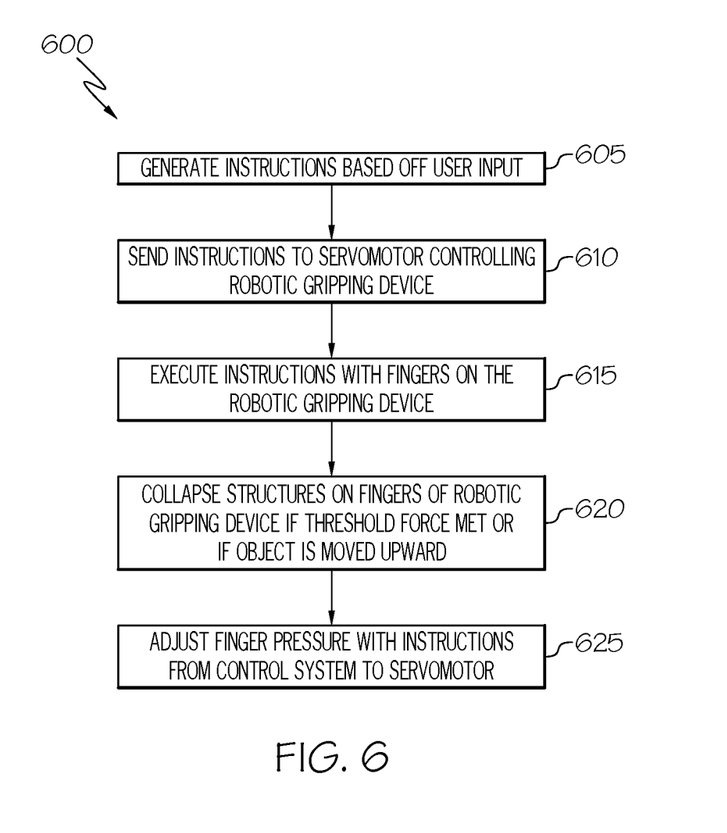
FIG. 6 depicts a method for a collapsible splined finger for grasping objects in a robotic system.

FIG. 6 shows an embodiment of the method for grasping objects with splined fingers 215. First, in step 605, the user can input machine readable instructions into a control system through a user input device 535. The input 535 may include a monitor, keyboard, mouse, printer, camera, microphone, speaker, touch-screen, and/or other device for receiving input and outputting information.

Then the instructions for control of the robotic fingers are sent to a servomotor 505 that controls the robotic gripping device 530 with various configurations of fingers for grasping objects in step 610. The instructions can be in any form available in current control system technology and move the various parts of the robotic gripping device 530 in order to position the fingers to grasp the object. The machine-readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine-readable instructions and stored in the memory module 520. Alternatively, the machine-readable instructions may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components.

In step 615, the robotic gripping device 535 can execute various maneuvers to grip an object. The gripper conforms to the shape of the object to be picked up by the robotic gripping device so that the object is not damaged or so that the object does not fall from the gripper device. The robotic gripping device uses fingers that act passively on the object at it is being gripped.

Then, in step 620, the collapsible structures on the robotic gripping device 535 that come into contact with the object are retracted into the base of the robotic gripping device 535 if a threshold force is met and as the object is moved upward. This threshold force can be set by a user using the user input 535 to grasp an object so that the object is not crushed but is held stably for movement. Various settings can be provided to the user to account for a varying angle that the robot approaches the object and other varying conditions, however the importance of the collapsible structures includes the ability that they can grasp an object when the robot approaches from an awkward angle. For instance, as the fingers are moved to grasp the object, the collapsible structures can collapse as they grasp the object and the collapsible structures that do not engage with the object are used to support the object.

Lastly, the user can further adjust the pressure of the fingers with instructions to the control system, in step 625. In one embodiment, the width of a cup or the object 220 may be measured by an image scanning of an image sensor unit (not shown), and a processing unit may control a gap between the first finger and the second finger according to the measured width. Further there may be sensors that provide feedback to the control system 510 that allow the object to be grasped such that the splined within the middle portion of the finger are collapsed and the object is grasped with the proper amount of force and firmness in order to move the object.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A robotic gripping device comprising:
two or more opposable fingers configured to move toward each other to grasp an object, wherein the two or more fingers include one or more a plurality of collapsible structures on the inner surface of an inner pad of the two or more fingers, wherein the plurality of collapsible structures collapse in response to reaching a certain threshold of force set by a user, and wherein the collapsible structures include one or more structures that do not collapse and support a lower surface of the object.

2. The robotic gripping device as described in claim 1, wherein the plurality of collapsible structures are curved structures that support a grasped object and collapse when an object is pulled in an outward direction, the outward direction including from a base to the to the tip of the two or more fingers.

3. The robotic gripping device as described in claim 1, wherein the plurality of collapsible structures on the inner pads of the fingers are delineated with a space between the structures both in the vertical and horizontal directions.

4. The robotic gripping device as described in claim 1, wherein a servo- motor controls the plurality of collapsible structures to increase or decrease the friction.

5. The robotic gripping device as described in claim 1, wherein the number of plurality of collapsible structures on the inner pads surfaces can be varied varies based on the usage of the two or more fingers.

6. The robotic gripping device as described in claim 1, wherein the two or more fingers are made of more than one different type of material for gripping.

7. An apparatus comprising:
two or more opposable fingers configured to move toward each other to grasp an object, wherein the two or more opposable fingers each include:
an inner surface;
an outer surface;

a set of ribs that connect the inner surface and the outer surface; and a set of collapsible structures on the inner surface, wherein the collapsible structures collapse in response to reaching a certain threshold of force set by a user, and wherein the collapsible structures include one or more structures that do not collapse and support a lower surface of the object.

8. The apparatus as described in claim 7, wherein the collapsible structures are curved structures that support a grasped object and collapse when the object is pulled in an outward direction, the outward direction including from a base to the to the tip of the two or more fingers.

9. The apparatus as described in claim 7, wherein the collapsible structures on the inner surfaces of the two or more fingers are delineated with a space between the collapsible structures both in the vertical and horizontal directions.

10. The apparatus as described in claim 7, wherein a servo-motor controls the collapsible structures to increase or decrease the friction.

11. The apparatus as described in claim 7, wherein the number of collapsible structures on the inner surfaces varies based on the usage of the two or more fingers.

12. The apparatus as described in claim 7, wherein the two or more fingers are made of more than one material for gripping.

13. A robotic gripping system comprising:
a robotic gripping device with two or more opposable fingers configured to move toward each other to grasp an object, wherein the two or more fingers include one or more collapsible structures on an inner surface of the two or more fingers,
wherein the one or more collapsible structures collapse in response to reaching a certain threshold of force set by a user, and wherein the collapsible structures include one or more structures that do not collapse and support a lower surface of the object; and
a control system configured to control the robotic gripping device, wherein the control system comprises:
one or more processors;
a non-transitory computer-readable memory; and
program instructions stored on the non-transitory computer-readable memory and executable by the one or more processors to control the robotic gripping device.

14. The system as described in claim 13, wherein the collapsible structures are curved structures that support the grasped object and collapse when the object is pulled in an outward direction, the outward direction including from a base to the to the tip of the two or more fingers.

15. The system as described in claim 13, wherein the collapsible structures on the inner surfaces of the two or more fingers are delineated with a space between the collapsible structures both in the vertical and horizontal directions.

16. The system as described in claim 13, including a servo-motor that controls the collapsible structures to increase or decrease the friction.

17. The system as described in claim 13, wherein the number of collapsible structures on the inner surfaces vary based on the usage of the two or more fingers.

18. The system as described in claim 13, wherein the two or more fingers are made of more than one material for gripping.

* * * * *